United States Patent [19]

Inoue

[11] Patent Number: 4,928,110

[45] Date of Patent: May 22, 1990

[54] THERMAL RECORDING CONTROL METHOD AND SYSTEM

[75] Inventor: Nobuhiro Inoue, Hachioji, Japan

[73] Assignee: Kabushiki Kaisha Toshiba, Kawasaki, Japan

[21] Appl. No.: 238,444

[22] Filed: Aug. 31, 1988

[30] Foreign Application Priority Data

Sep. 1, 1987 [JP] Japan ................................ 62-218467

[51] Int. Cl.⁵ ............................................. G01D 9/00
[52] U.S. Cl. ................................ 346/1.1; 346/76 PH; 407/120
[58] Field of Search ........................... 346/76 PH, 1.1; 400/120 PH

[56] References Cited

U.S. PATENT DOCUMENTS 3,984,809 10/1976 Dertouzos et al. .
4,376,942 3/1983 Toth et al. .
4,560,992 12/1985 Hakoyama .

FOREIGN PATENT DOCUMENTS

3113293 A1 10/1982 Fed. Rep. of Germany .
2596226 9/1987 France .
0011184 1/1983 Japan ............................ 400/120 PH Primary Examiner—Bruce A. Reynolds
Assistant Examiner—Huan Tran
Attorney, Agent, or Firm—Finnegan, Henderson, Farabow, Garrett and Dunner

[57] ABSTRACT

A thermal recording system is used as a recorder in a facsimile equipment or the like, and usually has a first operational mode in which picture data being read out at a pitch of M lines/mm is recorded at a pitch of M lines/mm and a second operational mode in which picture data being read out at a pitch of (M/n) lines/mm are repetitively recorded for every n lines at a pitch of M lines/mm. In particular, in the second operational mode of the system, activation time periods of a thermal head in the repetitive recording of every n lines are controlled to be sequentially shorter as the lines advance, whereby a recording time in the second operational mode can be reduced and the deterioration of the recorded picture quality can be prevented.

4 Claims, 7 Drawing Sheets

THERMAL RECORDING CONTROL METHOD AND SYSTEM

BACKGROUND OF THE INVENTION

1. Field of the Invention

The present invention relates to a thermal recording control method and system which control the thermal recording format of a thermal recorder used as a recorder in a facsimile equipment or the like and, more particularly, to a thermal recording control method and system which is suitably employed in such a thermal recorder that a line corresponding to a picture data is repeatedly recorded in the unit of plural lines in a feed direction to obtain a desired picture.

2. Description of the Prior Art

For example, in the case of a thermal recorder used as a recorder in a facsimile equipment. Such repetitive recording of every plural lines (usually, 2 lines) as mentioned above is carried out in a specific operational mode that is generally referred to as 'normal mode'.

More specifically, for example, in the event where a thermal head having a heater of a size allowing the recording of lines at a pitch of 7.7 lines/mm in the feed direction is used as a thermal member to record picture data being transmitted at a pitch of 3.85 lines/mm (which operational mode is usually referred to as 'normal mode'), adjustment of recording pitch is realized by recording an identical picture data by every two lines as shown in FIG. 1.

In FIG. 1, a zone shown by slanted lines corresponds to a black picture element, that is, the heater of the thermal head is heated in the zone. Further, reference symbol $\Delta t_1$ denotes a recording time of the thermal head necessary for the recording of one line, symbol $\Delta t_2$ denotes a recording time of the thermal head necessary for the recording of two lines, and these recording times $\Delta t$, and $\Delta t_2$ usually satisfy a relationship which follows.

$$\Delta t_1 = \Delta t_2/2 \qquad (1)$$

Meanwhile, the temperature rise and drop rates of a heater in a thermal head are generally determined by the type, model and so on of the thermal head. And when a single heater is continuously driven and heated, the temperature of the heater varies with time, e.g., following such a curve as shown in FIG. 2(a). Therefore, assuming, for example, that the aforementioned thermal head can record one line in 5 msec ($\Delta t_1 = 5$ msec), then picture data being transmitted at a pitch of 7.7 lines/mm can be recorded at a rate of one line/5 msec (which operational mode is usually referred to as 'fine mode' by contrast with the 'normal mode'), whereas picture data being transmitted at a pitch of 3.85 lines/mm as in the above case are recorded at a rate of one picture data line/10 msec ($\Delta t_2 = 10$ msec) because the data must be recorded in multiples of 2 lines.

That is, with respect to the picture data being transmitted at a rough rate of 3.85 lines/mm that is twice rougher than 7.7 lines/mm, it is also desirable to realize the reduction of a relative recording time of one line of the picture data to 5 msec (the actual recording rate being 2 lines/5 msec). However, this realization is difficult in actual applications for reasons which follow.

In general, a recording energy E [mJ/dot] of the aforementioned heater is expressed as follows.

$$E = V^2 \cdot \Delta \tau / R \qquad (2)$$

where V denotes a voltage applied to the heater (head application voltage), R denotes the resistance of the heater, and $\Delta \tau$ denotes an active (drive) time of the heater (the pulse width of a recording pulse) respectively. Among these factors, $\Delta \tau$ is usually used as a parameter of controlling the recording energy E.

Conventionally, it has been common practice to control the pulse width $\Delta \tau$ of the recording pulse according to the temperature rise of the entire thermal head (in particular, the heater substrate) detected by a temperature sensor disposed within the thermal head. FIG. 3 shows an example of how to set the pulse width of the recording pulse with respect to the temperature of such a thermal head.

According to such a method of controlling the recording energy E, however, in the case where, as mentioned above, picture data being transmitted at a pitch of 3.85 lines/mm are recorded in the unit of two lines with use of a thermal head allowing the recording of data at a pitch of 7.7 lines/mm an at a rate of one line/5 msec, if the recording time of one picture data line is set to be 5 msec, i.e., $\Delta t_2$ is set to be 5 msec, then the recording time $\Delta t_1$ corresponding to one of actually recorded lines must be set to be 2.5 msec. In this case, it becomes impossible to provide a sufficient cooling time to the heater and heat accumulation quickly takes place in the heater as shown in FIG. 2(b) in contrast with FIG. 2(a), which leads to so-called a 'trailing' phenomenon, with the result that the recorded picture quality is remarkably deteriorated. And such a phenomenon cannot utterly be avoided by such a recording energy control method based on the detection of the heater substrate temperature as mentioned above.

SUMMARY OF THE INVENTION

In view of the above circumstances, it is an object of the present invention to provide a thermal recording control method and system which can reliably reduce a relative recording time when an identical picture data is recorded in the unit of plural lines in a so-called 'normal mode', and which also can ensure stable picture quality in the recording operation.

In accordance with the present invention, the above object is attained by controlling the respective active times during which the thermal head is driven and heated for the respective pluralities of lines on identical data, to be sequentially smaller for the later lines.

As a result, the recording energies at the time of recording the second and subsequent ones of the lines of a picture data are set to be sequentially lower than the recording energy at the time of recording the first one of the lines, so that, even when the reduction of the recording time is realized in the above-mentioned manner, proper recording operation can be maintained without causing any excessive heat accumulation in the heater of the thermal head, any 'trailing' and other adverse phenomena. In other words, although the recording energies at the time of recording the second and subsequent ones of the lines on an identical data are lower (smaller) than that at the time of recording the first one, a proper color developing temperature necessary for the recording can be obtained with the help of heat accumulated in the heater itself.

It goes without saying that the present invention can be applied to any type of thermal recorder including the type in which data are thermally recorded directly on a thermal recording paper, the type in which data are thermally transferred onto an ordinary paper, and so on.

DESCRIPTION OF THE PREFERRED EMBODIMENT

Figure 4:
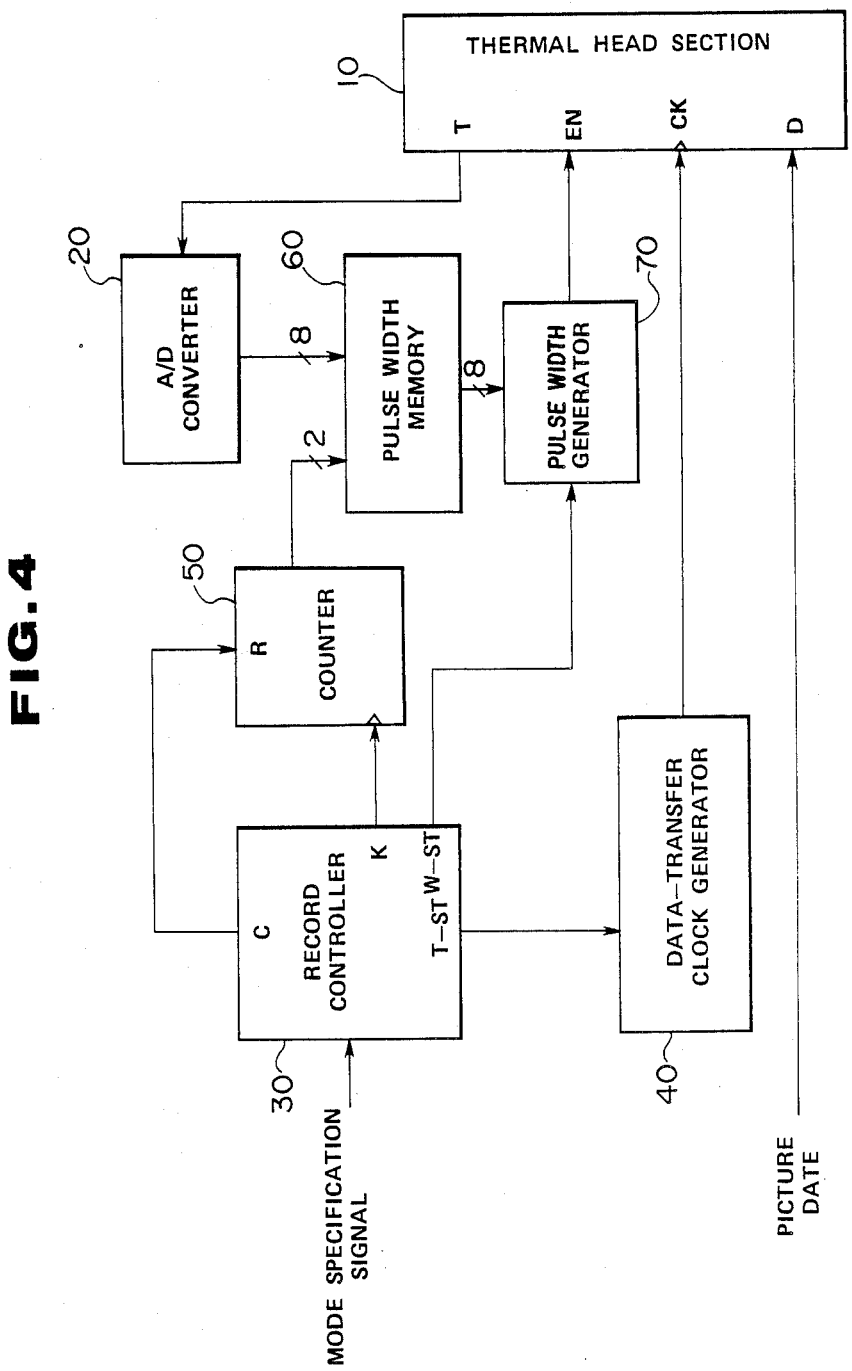
FIG. 4 is a block diagram showing an arrangement of an embodiment of a thermal recording control system according to the present invention.

Referring to FIGS. 4 to 7, there is shown an embodiment of a thermal recording control system according to the present invention, which, as shown in FIG. 4, comprises a thermal head section 10, an analog/digital converter (which will be referred to as the A/D converter, (hereinafter) 20 for converting an output (analog signal) of a temperature sensor incorporated in the thermal head section 10 into a digital signal of, for example, 8 bits in this embodiment, a recording controller 30 for controlling the general operation of the embodiment system on the basis of an externally applied mode specification signal (which selectively specifies any one of the aforementioned 'normal mode' and 'fine mode'), a clock generator 40 for generating a pulse for transfer of picture data to the thermal head section 10 under control of the recording controller 30, a counter 50 for performing counting operation of the basis of a pulse signal generated in the recording controller 30 and sent therefrom in synchronism with the recording start timing of every line, a pulse width memory 60 having many different values of the $\Delta \tau$ in the aforementioned equation (2) and the corresponding values of the recording energy E stored therein in the form of a table so that a value specified by address data, i.e., a count output of the counter 50 and a conversion output of the A/D converter 20, is read out of the above table as pulse width information, and a pulse generator 70 for generating a pulse signal having a pulse width specified by the pulse width information read out from the pulse width memory 60 and for applying the pulse signal to a terminal EN of the thermal head section 10 as an enable signal each time the recording controller 30 generates the recording start signal for each line.

The functions of the constituent circuits shown by blocks in FIG. 4 will be sequentially explained in the following.

Figure 5:
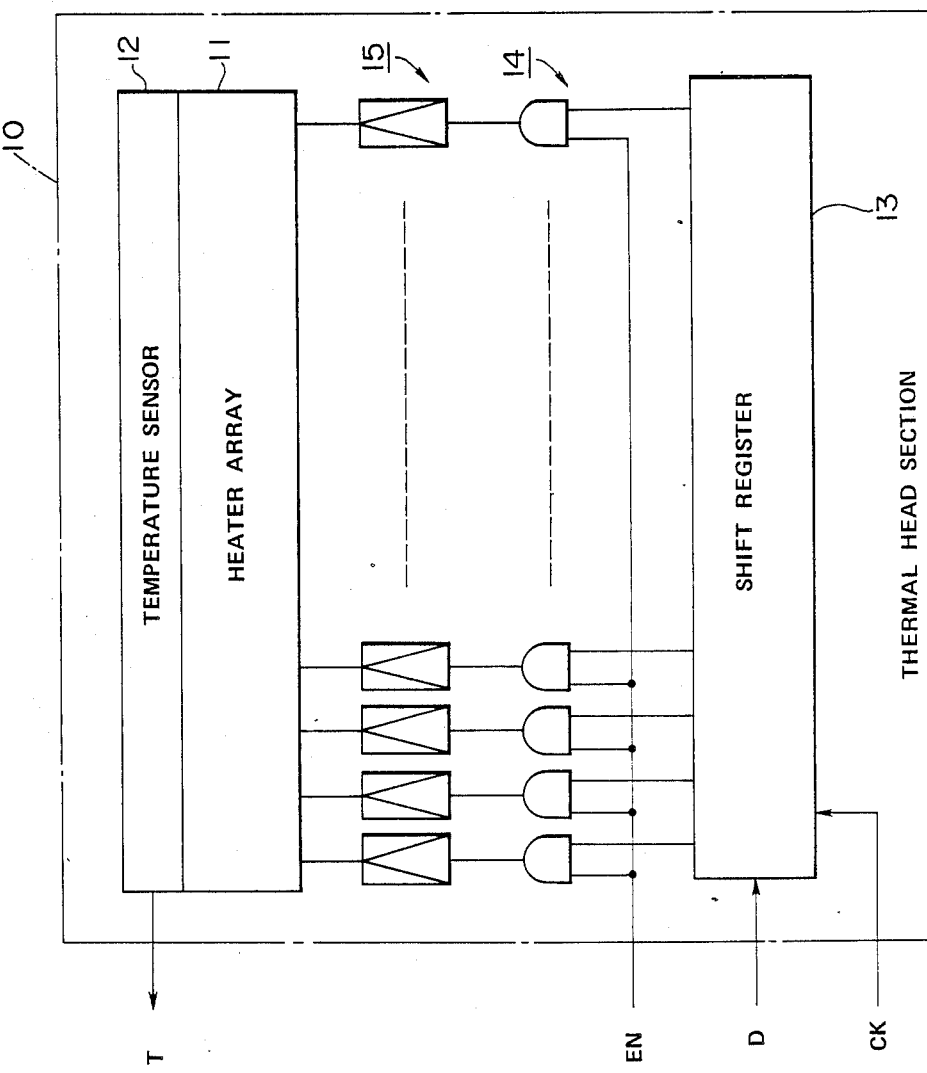
FIG. 5 is a block diagram showing an interior arrangement of a thermal head shown in FIG. 4.

Explanation will first be made as to the arrangement and operation of the thermal head section 10 by referring to FIG. 5. The thermal head section 10, as shown in FIG. 5, comprises a heater array 11 made up of a plurality of heaters arranged in a line in a main scanning direction of a recording part (not shown) and corresponding to one line of picture data, a temperature sensor 12 disposed, together with the heater array 11, on the thermal head substrate for detecting the temperature of the substrate, a shift register 13 for sequentially shifting and temporarily storing one line of serially received picture data D on the basis of a clock (which is used to transfer the picture data) CK received from the clock generator 40 and for outputting the stored one-line picture data D in a parallel manner as illustrated, an AND gate array 14 for outputting ones of the picture data having a logical level '1' under the AND condition between the respective parallel output picture data and the pulse signal (the enable signal EN) generated at the pulse generator 70, and a driver array 15 for driving and heating associated ones of the heaters of the heater array 11 on the basis of outputs of the AND gates of the AND gate array 14. That is, in this thermal head section 10, only ones of the heaters corresponding to ones (corresponding to 'black picture elements') of the one-line picture data which are stored in the shift register 13 and which have a logical level '1' are driven and heated only during the pulse width period (enable period) of the pulse signal (enable signal EN) received from the pulse generator 70 only when the thermal head section 10 receives the enable signal EN.

Referring again to FIG. 4, the recording controller 30 performs general control over the embodiment system on the basis of the mode specification of the mode specification signal. More specifically, the controller 30 first applies a transfer start signal from its terminal T-ST to the clock generator 40, as the first control operation. The clock generator 40, when receiving the transfer start signal, applies a predetermined clock signal corresponding to one line to a terminal CK of the thermal head section 10 in synchronism with the transfer start signal. In the thermal head section 10, the shift register 13 receives at its terminal D picture data corresponding to one line in synchronism with the received clock signal.

When the thermal head section 10 (precisely speaking, the shift register 13 incorporated in the thermal head section) receives the one-line picture data, the recording controller 30 executes control over the system in one of the two modes on the basis of the contents of the mode specification signal, i.e., in the 'fine mode' when every one-line recording is specified by the mode specification signal and in the 'normal mode' when every plural-lines (two lines are assumed in this embodiment for the convenience of explanation) recording is specified by the mode specification signal.

① FINE MODE

The recording controller 30 supplies from its terminal W-ST to the pulse generator 70 a recording start signal causing the starting of recording, i.e., the driving of the thermal head section 10. This causes the pulse generator 70 to generate a recording pulse (enable signal) having a predetermined pulse width determined by the pulse width information of, e.g., 8 bits in this embodiment received from the pulse width memory 60, and to apply the generated recording pulse to an enable terminal EN (corresponding to one input terminal of the AND gate array 14) of the thermal head section 10.

In this operational mode, an count output (of 2 bits in this embodiment) of the counter 50 is kept to be '00' and the pulse width memory 60 acts to read the above pulse width information on the basis of only a temperature data (of 8 bits) received from the A/D converter 20.

It will be appreciated from the foregoing explanation that the thermal head section 10 applied with the recording pulse (enable signal) causes currents to flow through corresponding ones (corresponding to picture data indicative of 'black picture elements') of the heaters of the heater array 11, whereby the corresponding heaters are driven and heated. The pulse width of this recording pulse is used as the value of $\Delta\tau$ in the equation (2) to determine the recording energy E.

After recording corresponding to one line has been completed in this manner, the recording controller 30 causes the not shown recording section to be fed in the adjacent-scanning-line direction by an amount corresponding to one line so that the transfer start signal is again applied to the clock generator 40 for data transfer, whereby picture data corresponding to the next one line is transferred to the thermal head section 10.

The above control operation is repeatedly executed.

② NORMAL MODE

The recording controller 30, prior to sending the above recording start signal, sends a single count pulse from its terminal K to the counter 50 and thereafter sends the recording start signal from its terminal W-ST to the pulse generator 70.

As a result, the count value (made up of 2 bits) of the counter 50 is incremented from '00' to '01', while the pulse width memory 60 reads out the corresponding pulse width information therefrom on the basis of the temperature data output (8 bits) of the A/D converter 50 and the count output '01' of the counter 50. And the pulse generator 70, in response to the reception of the recording start signal, generates a recording pulse (enable signal) of a predetermined pulse width based on the pulse width information read out from the pulse width memory 60 and applies the generated recording pulse to the enable terminal EN of the thermal head section 10.

As a result, in the thermal head section 10, the corresponding ones of the heaters are driven and heated only during a time corresponding to the pulse width of the recording pulse as in the above case.

After the recording corresponding to one line has been completed in this way, the recording controller 30 further feeds the not shown recording section by an amount corresponding to one line and sends a single count pulse from its terminal K again to the counter 50 while the picture data stored in the thermal head section 10 (shift register 13) is kept therein as it is. Following the above operation, the controller 30 similarly sends the recording start signal from its terminal W-ST to the pulse generator 70.

This results in that the count value (of 2 bits) of the counter 50 is further incremented from the previous value '01' to '10' so that the pulse width memory 60 reads out the corresponding pulse width information therefrom this time on the basis of the temperature data (8 bits) output of the A/D converter 20 and the new count output '10' of the counter 50.

Figure 3:
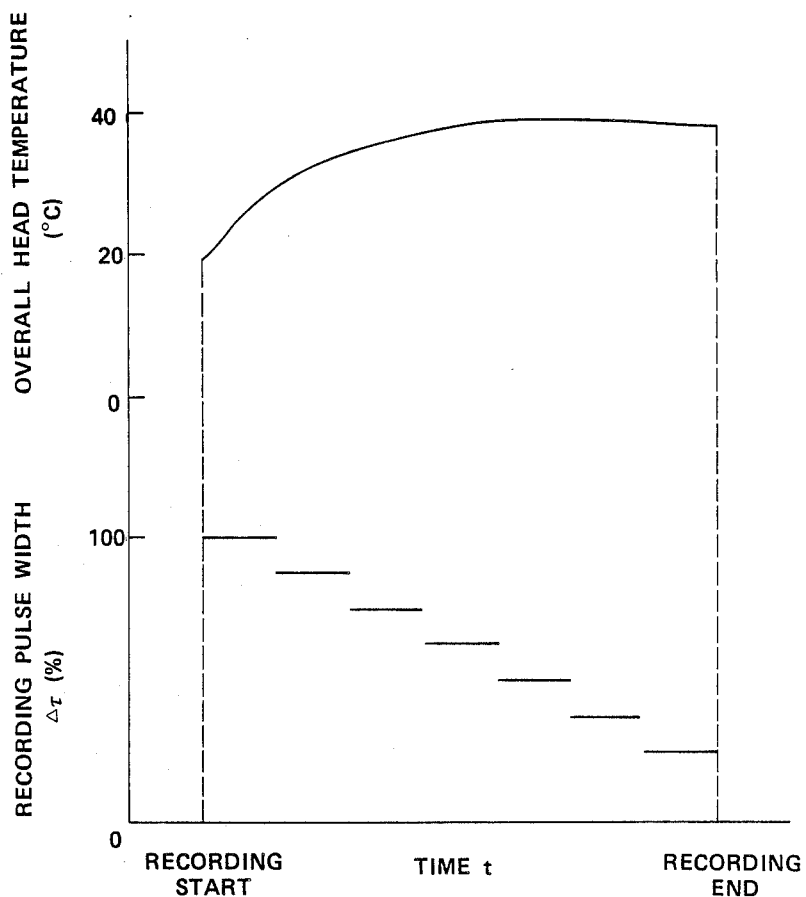
FIG. 3 is a time chart showing an example of how to set the pulse width of a recording pulse with respect to the temperature variation of the thermal head.

The pulse width information stored in the pulse width memory 60 are previously set so that, as shown in FIG. 3, the larger the temperature data output of the A/D converter 20 is the smaller the pulse width information is, and the pulse width will respect to the count output '10' of the counter 50 corresponding to the second line is smaller than that with respect to the count output '01' corresponding to the first line. And the pulse width information $\Delta\tau$ corresponding to the count value '01' and a pulse width information $\Delta\tau'$, corresponding to the count value '10' at least satisfy at all times a relationship therebetween which follows.

$$\Delta\tau > \Delta\tau'$$

Accordingly, the pulse generator 70 generates a recording pulse of a predetermined pulse width based on the read-out pulse width information and applies it to the thermal head section 10 and the thermal head section 10 having received the recording pulse drives and heats associated ones of the heaters during only a time corresponding to the pulse width of the same recording pulse, as in the case of the recording of the first line; but the recording energy supplied to the heaters at the time of recording the second line can be made reliably smaller than that at the time of recording the first line.

At the stage of the completion of the second line, the recording controller 30 feeds the not shown recording section by an amount corresponding to one line as in the above case, supplies a reset signal from its terminal C to the counter 50 to initialize the count value of the counter 50 to be '00' and also applies the transfer start signal to the data transferring clock generator 40 to transfer picture data corresponding to the next one line to the thermal head section 10.

In the 'normal mode', the above control operation is repeatedly executed.

Figure 6:
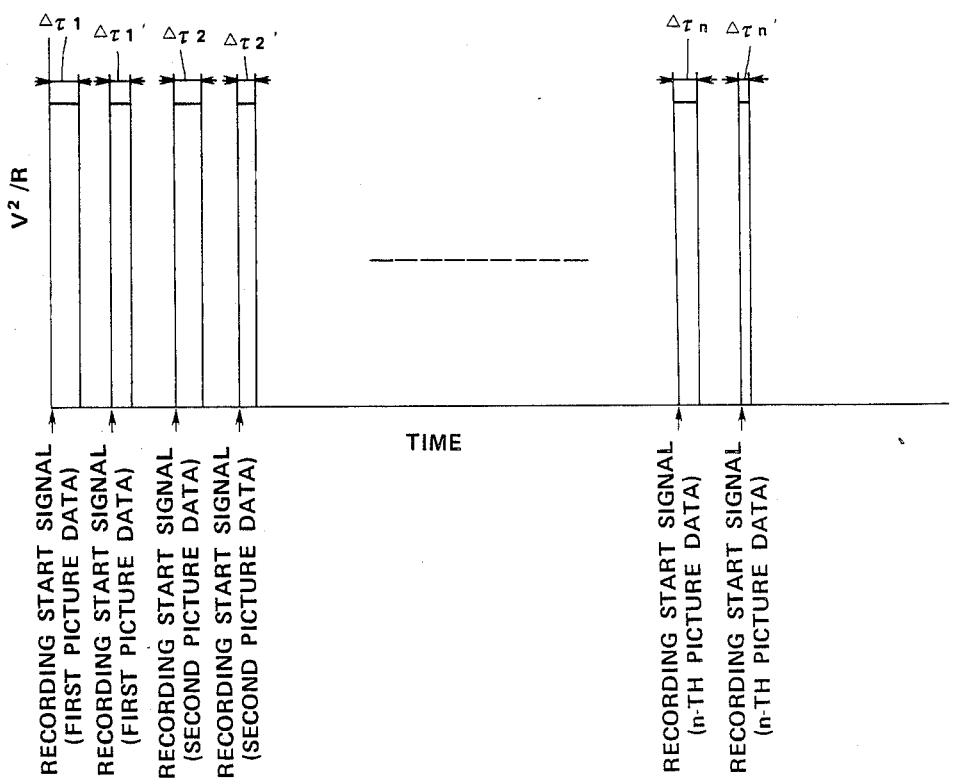
FIGS. 6 and 8 are time charts showing variations in the recording energy supplied to the thermal head heater in response to a pulse generated by a pulse generator shown in FIG. 4, respectively.

Exemplified in FIG. 6 is a variation in the recording energy E for each one line in the 'normal mode'. In the drawing, areas $(V^2/R)\cdot\Delta\tau_1$, $(V^2/R)\cdot\Delta\tau_1'$, $(V^2/R)\cdot\Delta\tau_2$, $(V^2/R)\cdot\Delta\tau_2'$, . . . enclosed by rectangular pulse waveforms denote the recording energies E supplied to the associated heaters respectively in the one-line recording operation, where $\Delta\tau_1$ denotes a pulse width indicated by the pulse width information read out from the pulse width memory 60 at the time of recording the first line of first picture data stored in the thermal head section 10, $\Delta\tau_1'$ denotes a pulse width indicated by the pulse width information read out from the pulse width memory 60 at the time of recording the second line of the same first picture data, $\Delta\tau_2$ denotes a pulse width indicated by the pulse width information read out from the memory 60 at the time of recording the first line of second picture data stored in the thermal head section 10, $\Delta\tau_2'$ denotes a pulse width indicated by the pulse width information read out from the memory 60 at the time of recording the second line of the same second picture data. And these pulse widths $\Delta\tau_1$, $\Delta\tau_1'$, $\Delta\tau_2$ and $\Delta\tau_2'$ are set to meet relationships which follow;

$$\Delta\tau_1 \geq \Delta\tau_2, \ \Delta\tau_1 > \Delta\tau_1', \ \text{and} \ \Delta\tau_2 > \Delta\tau_2'.$$

Figure 7:
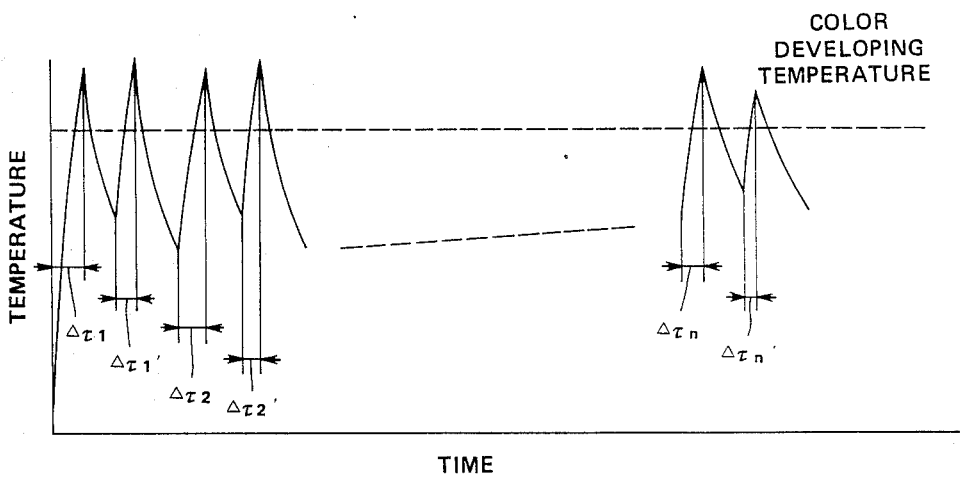
FIGS. 7 and 9 are time charts showing variations in the temperature of the thermal head with time when the thermal head heater is continuously driven and heated by plural lines under control of the system shown in FIG. 4, respectively.

There is shown in FIG. 7 an example of temperature variation of one heater with time when the heater is continuously driven in the 'normal mode', in comparison with the variation of the recording energies E shown in FIG. 6.

Figure 1:
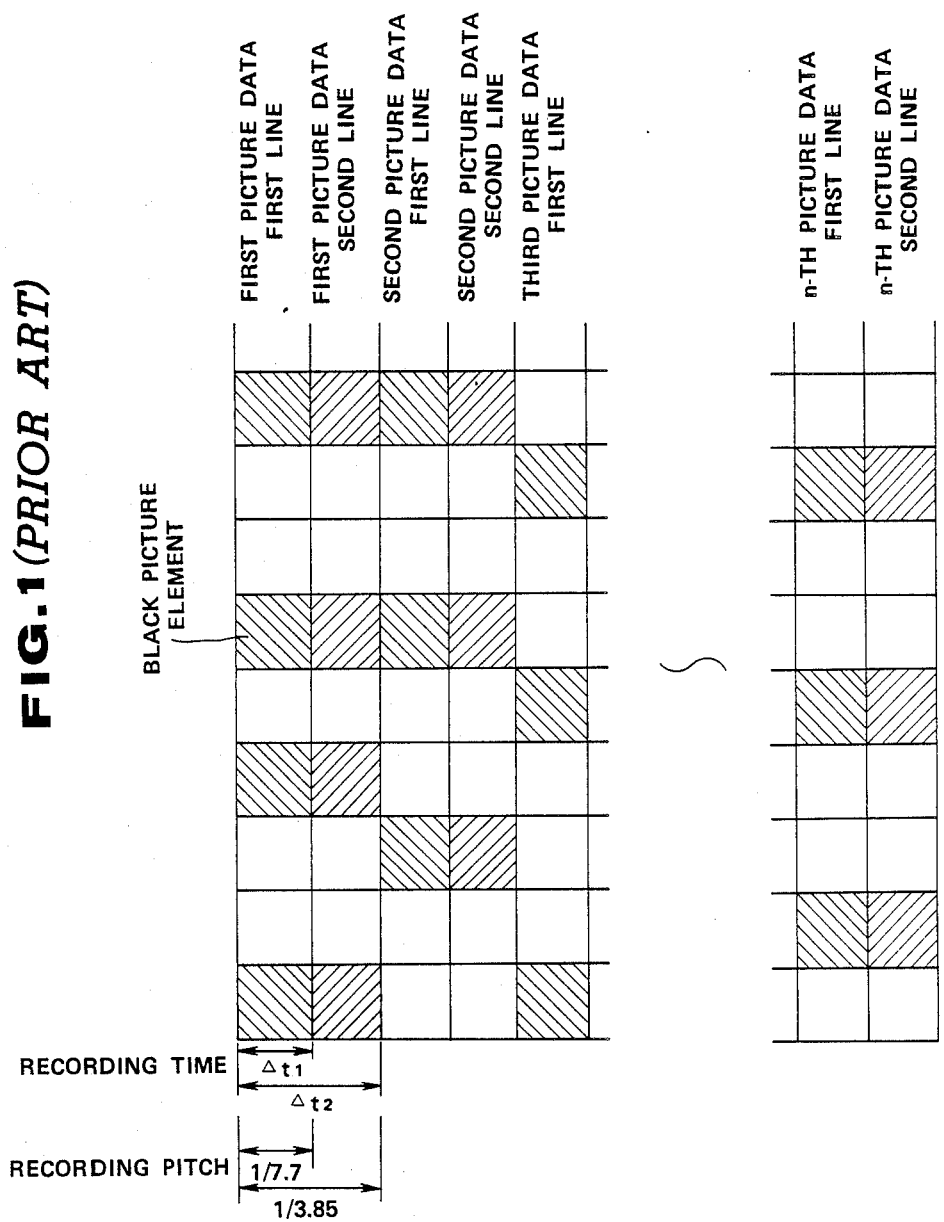
FIG. 1 shows, in a model form, an example of thermal recording format in an operational mode in which an identical picture data is repeatedly recorded in multiples of 2 lines.
Figure 2A:
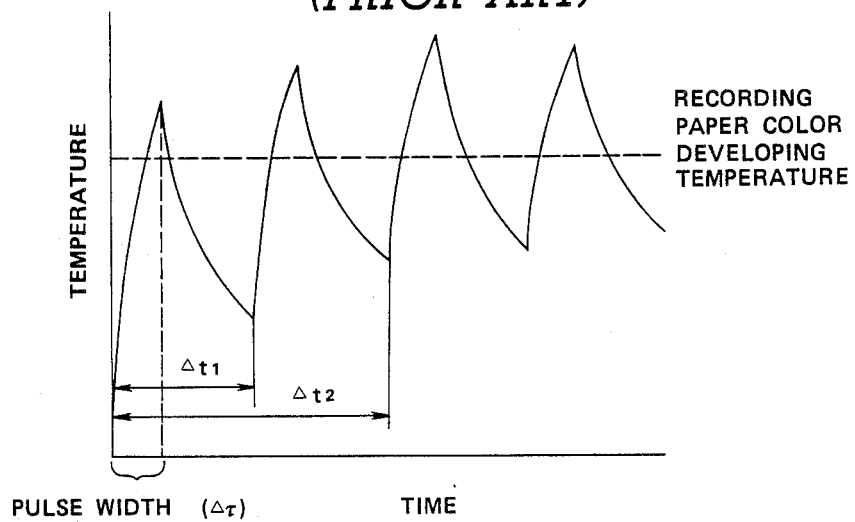
FIGS. 2(a) and 2(b) are time charts showing variations in the temperature of a thermal head with time when a heater of the thermal head is continuously driven and heated by plural lines in a conventional manner, respectively.
Figure 2:
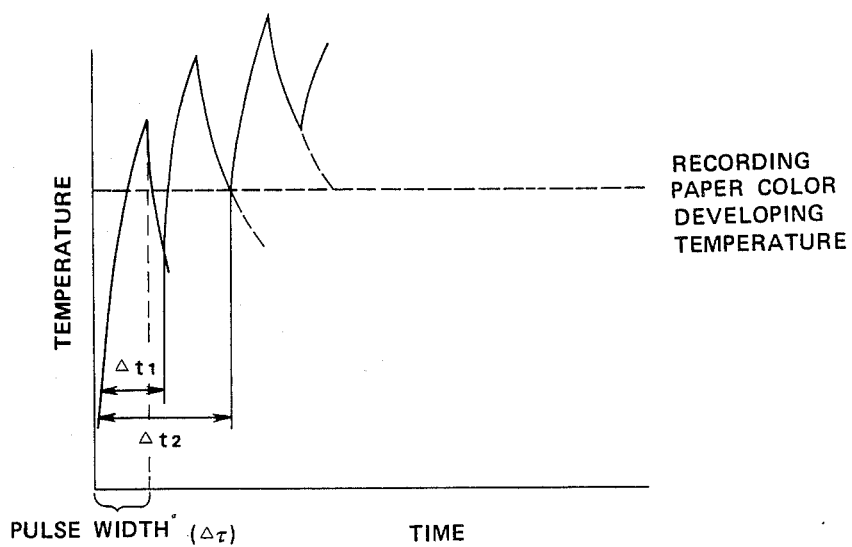

It will be clear from the comparison between FIG. 7 and FIG. 2(b) that, in accordance with the foregoing embodiment system, even in the case of the two-line recording of identical data at a high speed (in a short time), the heater temperature at the time of completion of the recording of every line can be controlled to be positively below the color developing temperature. For example, even in the event where such a thermal head is used that allows the recording of picture data being transmitted at a pitch of 7.7 lines/mm at a recording rate of one line/5 msec as mentioned earlier, picture data being transmitted at a pitch of 3.85 lines/mm can be recorded at a recording rate of 2 lines/5 msec always with a good quality of picture and without such undesirable phenomenon as the trailing. Such recording rate change can be properly achieved under control of the recording controller 30 according to the specification contents of the mode specification signal.

Although the present invention has been applied to the thermal head of the type wherein the heater array 11 (refer to FIG. 5) is made as a single group unit and associated ones (corresponding to picture data indicative of 'black picture elements') of the heaters of the array 11 are collectively driven and heated in response to the application of the single enable signal EN (recording pulse) to the array in the foregoing embodiment, the invention can be similarly applied to other types of thermal heads, e.g., such a type of thermal head that the heater array 11 is previously divided into a plurality of groups which are driven on the basis of the individual enable signals (recording pulses). In the latter case, the pulse generator 70 may generate a plurality of recording pulses corresponding in number to such divided groups, or a plurality of such pulse generators 70 corresponding in number to the divided groups may be provided.

Further, such a pulse width memory 60 as, for example, ROM or the like has been employed as a means for applying to the pulse generator 70 pulse width information determined by the recording line and the thermal head temperature in the embodiment, but there may be such a suitable operating circuit that circulates and outputs information equivalent to the above pulse width information on the basis of the count output of the counter 50 and the temperature data A/D conversion output of the A/D converter 20.

Furthermore, not only the capacity (the set number of output counts) of the counter 50 but also the indication (counting) form of the recording line is not limited to the particulars in the embodiment but arbitrarily set. For example, though the count value of the counter 50 has been incremented from '00' to '01' or from '01' to '10' at the time of staring recording the respective lines in the 'normal mode' to determine the pulse width of the recording pulse then applied to the thermal head section 70 on the basis of the incremented count value '01' or '10' in the 'normal mode' for the convenience of explanation, it is unnecessary to set the count value used for determining the arbitrary pulse width to be '01' or '10' after the increment of the counter and it is rather preferable to use the count value '00' or '01' prior to the increment of the counter to previously provide the pulse width information to the pulse generator since this facilitates the timing of the entire system and also the design.

Figure 8:
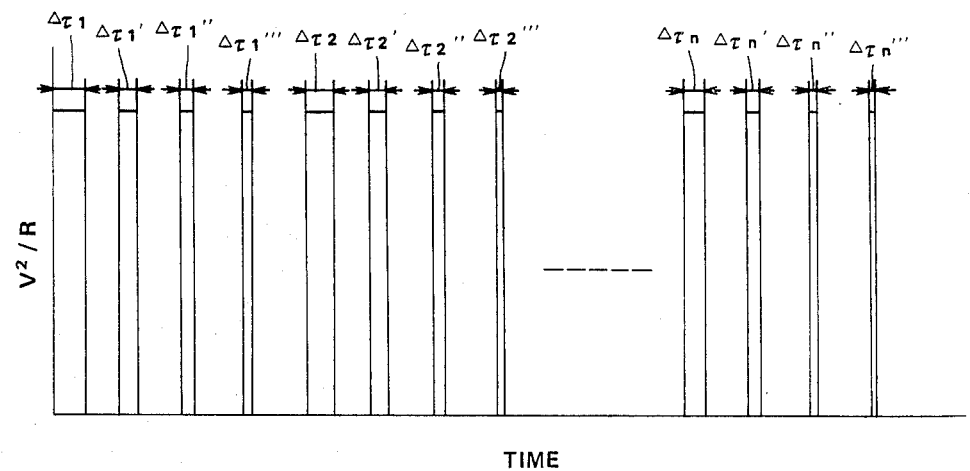
Figure 9:
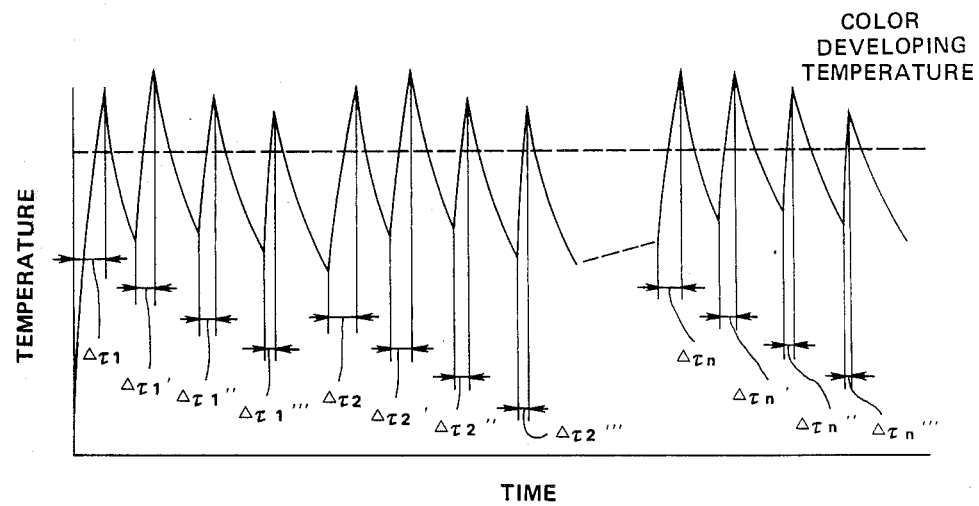

In addition, the above explanation has been made as to the case where identical picture data is repeatedly recorded for every two lines in the 'normal mode' in the foregoing embodiment. However, this invention is effective when a thermal head allowing the recording of picture data at a pitch of M lines/mm is used to repetitively record the picture data for every n lines at a pitch of (M/n) lines/mm, and more particularly when a thermal head allowing the recording of picture data being transmitted at a pitch of 15.4 lines/mm is used to repetitively record the picture data for every 4 lines at a pitch of 3.85 lines/mm. Shown in FIGS. 8 and 9 for your reference are variations in the recording energy supplied to the heater and variations in the temperature of the heater with time when identical picture data is repetitively recorded for every 4 lines, respectively.

What is claimed is:

1. A thermal recording control system comprising:
    a thermal head having a plurality of heaters arranged in a line across a feed direction of a recording paper, said plurality of heaters corresponding to a line of picture data;
    register means for storing a plurality of data corresponding to said line of picture data, each of the plurality of data corresponding to a respective one of the plurality of heaters, and outputting the plurality of data to the thermal head in a parallel manner;
    counter means;
    first control means for incrementing the value of the counter means from an initial value each time said stored plurality of data are recorded on a recording paper;
    means for setting a time period for activating a respective heater of the thermal head to record the stored corresponding data on the recording paper in response to the value of said counter means, the length of said activation time period being decreased as the counter value is increased;
    means for activating the respective heater in response to said register means during the set activation time period; and
    second control means for setting the counter means to the initial value when the stored plurality of data are repetitively recorded on the recording paper a predetermined number of times so that a subsequent line of picture data can be recorded on the recording paper.

2. The thermal recording control system of claim 1, further comprising means for detecting a temperature accumulated in the respective heater, and wherein said activation time period is decreased in response to the detected temperature.

3. A method for controlling recording of a line of picture data with a thermal recording head on a recording paper, the picture data being provided to the thermal head at a pitch of (M/N) lines/mm, M and N being a positive integer and M being greater than or equal to N, the thermal head being capable of recording the picture data at a pitch of M lines/mm in a feed direction of the recording paper, comprising activating the thermal head at a different time period for repetitively recording a same line of the picture data N times, the activation time period corresponding to each of the N times of repetitive recording being decreased in time sequence, the temperature for heating the thermal head at the beginning of each of the different activation time periods being lower than a color developing temperature of the thermal head.

4. The method of claim 3, wherein the activation time period corresponding to each of the N times of repetitive recording is determined in response to the heat accumulated in the thermal head.

* * * * *